United States Patent Office

3,777,019
Patented Dec. 4, 1973

3,777,019
STABILIZED CHLORPROMAZINE HYDROCHLORIDE SOLUTION FOR USE IN DISPOSABLE CARTRIDGES
Howard J. Levin, Norristown, Pa., assignor to American Home Products Corporation, New York, N.Y.
No Drawing. Filed Feb. 3, 1971, Ser. No. 112,427
Int. Cl. A61k 27/00
U.S. Cl. 424—175                                                 1 Claim

ABSTRACT OF THE DISCLOSURE

The invention is directed to a stable, injectable solution of chlorpromazine hydrochloride for use particularly in disposable cartridges. The chlorpromazine hydrochloride has known utility in pharmacology as a tranquilizer.

---

This invention is directed to especially stabilized solutions of chlorpromazine hydrochloride which are stabilized by use of an antioxidant and a chelating system. The effect of the antioxidant-chelating system is to produce improved physical stability in that the formulation does not discolor as readily as other systems.

BACKGROUND OF THE INVENTION

The most closely related known prior art is U.S. Pat. 2,645,640.

This invention is related to the development of a stable, injectable solution of chlorpromazine hydrochloride for marketing in rubber-closured vials or ampuls or disposable cartridges, such as those sold under the trademark "Tubex." At present, chlorpromazine hydrochloride injection is marketed in both 10 cc. multiple-dose vials and ampuls.

Because of the oxygen-sensitive nature of chlorpromazine hydrochloride in solution, as well as other phenothiazine derivatives, there is a problem of oxidative degradation occurring in stored disposable cartridges, resulting in physical instability, especially darkening.

The storage of oxygen-sensitive injectable products in disposable cartridges is more difficult than storage of the same product in all-glass flame-sealed ampuls or rubber-closured glass vials. The reason resides in the nature of the injectable package, that is, its protection against the ingress of air (or oxygen) following the normal procedure wherein the injectable product is filled into the container, the void volume is flushed with an inert gas and the package sealed. In the case of the ampuls, no ingress of air takes place during storage or shelf-life; in the case of rubber-closured vials, only minimal ingress of air takes place during shelf-life; and, in the case of disposable cartridges, higher levels of air ingress take place during shelf-life.

It is an object of the present invention to provide chlorpromazine hydrochloride solutions having improved physical stability.

It is a particular object of the present invention to provide chlorpromazine hydrochloride solutions which are stabilized sufficiently against oxidative degradation to permit their use in disposable cartridges and rubber-closured vials.

It has been found that aqueous chlorpromazine hydrochloride solutions may be improved in stability by the addition of an antioxidant-chelating agent system. The preferred antioxidant used in combination with the preferred chelating agent is sodium bisulfite. Sodium bisulfite is known in the art for use in combination with other antioxidants such as ascorbic acid and sodium sulfite with chlorpromazine hydrochloride in aqueous solutions but is not known to be used alone in such solutions. The preferred range of sodium bisulfite in the present invention is 0.2 to 0.3 percent by weight per volume (w./v.).

The preferred chelating agent is calcium disodium edetate used in a range of 0.005 to 0.05 percent by weight per volume, although disodium edetate may also be used. In practice it has sometimes been found advantageous to form the calcium disodium edetate by the use of disodium edetate and calcium chloride as separate ingredients in the dry mix. These ingredients upon dissolution form the desired calcium disodium edetate chelating agent.

It has been found that improved physical properties are imparted to chlorpromazine hydrochloride aqueous solutions by the present antioxidant-chelating agent system. Among the improved physical properties is resistance to discoloration. Specifically, the solutions do not darken as readily as chlorpromazine hydrochloride solutions without the antioxidant-chelating agent system. The extent of resistance to discoloration is a measure of the improvement of other properties, such as improved shelf-life.

The buffer system may be any of those known to be compatible with the other members of the composition. A particularly effective buffer is anhydrous sodium acetate and glacial acetic acid.

In order more clearly to disclose the nature of the present invention, specific examples of the practice of the invention are hereinafter given. It should be understood, however, that this is done solely by way of example and is intended neither to delineate the scope of the invention nor limit the ambit of the appended claim.

EXAMPLE I

Because of (1) the known oxygen-sensitive nature of chloropromazine hydrochloride solutions (even more evidenced by the inclusion of the ascorbic acid-sodium bisulfite-sodium sulfite antioxidant system in the leading marketed chlorpromazine hydrochloride injection products), and (2) the known greater difficulty of storing oxygen-sensitive injectable solutions in disposable cartridges, the leading marketed chlorpromazine hydrochloride vial formulation was prepared for stability evaluation compared with the present invention in rubber-closured vials, all-glass ampules and disposable cartridges such as those sold under the trademark Tubex.

About 10 to 40 samples were prepared for each condition in each of the following formulas:

Formula I

|  | Mg. |
|---|---|
| Chlorpromazine HCl | 25 |
| Phenol (preservative) | 5 |
| Sodium bisulfite (antioxidant) | 2.5 |
| Disodium edetate (chelating agent) | 0.099 |
| Calcium chloride (chelating agent) | 0.039 |
| Sodium acetate, anhydrous (buffer) | 6.15 |
| Acetic acid glacial (buffer) to adjust to approx. pH 4.2. | |
| Water—to make 1.0 cc. | |

MARKETED CHLORPROMAZINE HYDROCHLORIDE

Formula II

|  | Mg. |
|---|---|
| Chlorpromazine HCl | 25 |
| Ascorbic acid (antioxidant) | 2 |
| Sodium bisulfite (antioxidant) | 1 |
| Sodium sulfite (antioxidant) | 1 |
| Sodium chloride | 1 |
| Benzyl alcohol (preservative) | 20 |
| Water—to make 1.4 cc. | |

Both formulations were prepared with nitrogen gas in the laboratory and filled, using a nitrogen flush, into all-glass ampuls, rubber-closured vials, 1 cc. in a 1 cc. size Tubex, 2 cc. in a 2 cc. size Tubex, ½ filled Tubex (1 cc. in a 2 cc. size Tubex). The physical stability is shown in the attached tables. Table I shows the physical stability obtained in stored ampuls; Table II is stored rubber-closured vials; Table III in 1 cc. in a 1 cc. size Tubex; Table IV in 2 cc. in a 2 cc. size Tubex; and Table V in ½ filled Tubex. In all cases the visual physical observations of the solutions are described as follows: NC=no physical change (no visual discoloration) from the initial colorless solution. D1 and D2 refer to slight darkening only detectable by trained observers. D3 indicates the first degree of darkening which can be observed by untrained observers. D4 and D5 indicate severe darkening. More than one entry indicates variation in individual samples. Chemical stability of the chlorpromazine hydrochloride is not included on the attached tables because even after 6 months at 45° C., the assay in every case is with ±3 percent of the initial value.

TABLE I.—AMPULS

|  | Marketed chlorpromazine hydrochloride, vial formula | Formula I |
|---|---|---|
| 16 mos. at 5° C | NC | NC |
| 16 mos. at 25° C | NC | NC |
| 16 mos. at 35° C | NC | NC |
| 16 mos. at 45° C | NC | NC |

TABLE II.—RUBBER-CLOSURED VIALS

|  | Marketed chlorpromazine hydrochloride, vial formula | | Formula I | |
|---|---|---|---|---|
|  | Closure A | Closure B | Closure A | Closure B |
| 16 mos. at 5° C | NC | NC | NC | NC |
| 16 mos. at 25° C | NC | NC | NC | NC |
| 10 mos. at 35° C | NC, D1 | NC, D1, D2 | NC, D1 | NC |
| 16 mos. at 35° C | D1, C2, D3 | NC, D1, D2 | NC, D1 | NC |
| 6 mos. at 45° C | D2, D3 | NC, D1 | NC, D1 | NC |
| 10 mos. at 45° C | D3, D4 | NC, D1, D2, D3 | D1 | NC |

Note.—Closure A=A butyl rubber closure supplied by a particular supplier. Closure B=A butyl rubber closure supplied by a different supplier.

TABLE III

[1 cc. in a 1 cc. size Tubex]

|  | Marketed chlorpromazine hydrochloride, vial formula | | Formula I | |
|---|---|---|---|---|
|  | Closure A | Closure B | Closure A | Closure B |
| 16 mos. at 5° C. | NC | NC | NC | NC |
| 16 mos. at 25° C. | NC D1, | D1, D2, D3 | NC | NC |
| 9 mos. at 35° C. | D2, D3 | D3, D4, D5 | D1 | NC, D1, D2 |
| 6 mos. at 45° C. | D1, D2, D3, D4 | D3, D4, D5 | NC, D1 | NC |

TABLE IV

[2 cc. in a 2 cc. size Tubex]

|  | Marketed chlorpromazine hydrochloride, vial formula | | Formula I | |
|---|---|---|---|---|
|  | Closure A | Closure B | Closure A | Closure B |
| 16 mos. at 5° C | NC | NC | NC | NC |
| 16 mos. at 25° C | D1 | D1 | NC | NC |
| 9 mos. at 35° C | D2 | D2 | NC | NC |
| 6 mos. at 45° C | D1 | D2 | NC | NC |

TABLE V

[½ filled Tubex (1 cc. in a 2 cc. size Tubex)]

|  | Marketed chlorpromazine hydrochloride, vial formula | | Formula I | |
|---|---|---|---|---|
|  | Closure A | Closure B | Closure A | Closure B |
| 16 mos. at 5° C. | NC | NC | NC | NC |
| 16 mos. at 25° C. | NC | D1 | NC | NC |
| 9 mos. at 35° C. | D2, D3, D4 | D2, D3 | NC, D1 | NC, D1, D2, D3 |
| 6 mos. at 45° C. | D1, D2, D3 | D1, D2, D3 | NC | NC |

A discussion of the comparative physical stability results shown above within each table follows:

Table I.—Physical stability of Formula I is equivalent to the other formula in ampuls.

Table II.—Physical stability of Formula I is improved versus the marketed chlorpromazine hydrochloride vial formula.

Table III.—Physical stability of Formula I is much improved versus the marketed chlorpromazine hydrochloride vial formula.

Table IV.—Physical stability of Formula I is improved versus the marketed chlorpromazine hydrochloride vial formula.

Table V.—Physical stability of Formula I is much improved versus the marketed chlorpromazine hydrochloride vial formula.

From the physical stability data presented it can be seen that this invention as exemplified by Formula I exhibits no improvement versus the marketed chlorpromazine hydrochloride formula in ampuls although it does exhibit improvement over the tested formula in rubber-closured vials. However, Formula I exhibited a dramatic improvement in physical stability versus the other studied formula when stored in the more sensitive (to air ingress) Tubex disposable cartridge packages.

The specific utility of this improved injectable formulation of chlorpromazine hydrochloride is for use in the more exacting requirements of injectable products for packaging in disposable cartridges like Tubex.

As can be seen in Table II, Formula I does show an improved physical stability picture as compared to the other formula when stored in rubber-closured vials.

From the foregoing example it may be concluded that an improved chlorpromazine hydrochloride aqueous solution having improved stability and freedom from discoloration is as follows:

|  | Grams per 100 cc. |
|---|---|
| Chlorpromazine HCl | 1.0 to 5.0 |
| Phenol (preservative) | 0.25 to 0.5 |
| Sodium bisulfite (antioxidant) | 0.2 to 0.3 |
| Disodium edetate (chelating agent) | 0.005 to 0.05 |
| Calcium chloride (chelating agent) | 0.002 to 0.02 |
| Sodium acetate and acetic acid (buffer) as needed to adjust to pH 3.8–4.8. | |

It is to be noted that calcium disodium edetate should be present in the amount of 0.005 to 0.05 gram per 100 cc. This concentration may be achieved by adding 0.005 to 0.05 gram per 100 cc. of disodium edetate and 0.002 to 0.02 gram per 100 cc. of calcium chloride.

EXAMPLE II

Another formulation without calcium chloride that will provide the same degree of improved physical stability and freedom from discoloration as shown in Formula I is as follows:

Formula III

|  | Mg. |
|---|---|
| Chlorpromazine HCl | 25 |
| Phenol | 5 |
| Sodium bisulfite | 2.5 |
| Disodium edetate | 0.099 |
| Sodium acetate, anhydrous | 6.15 |
| Acetic acid glacial to adjust to approx. pH 4.2. | |
| Water—to make 1.0 cc. | |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An improved oxidation resistant chlorpromazine hydrochloride solution for use in a disposable cartridge and having sodium bisulfite as its sole antioxidant comprising:

| | Mg. |
|---|---|
| Chlorpromazine hydrochloride | 25 |
| Phenol | 5 |
| Sodium bisulfite | 2.5 |
| Disodium edetate | 0.099 |
| Calcium chloride | 0.039 |

Sodium acetate and acetic acid to adjust to about pH 4.2.
Water—to make 1.0 cc.

References Cited

Remington's Practice of Pharmacy, 1965, 13th ed., pp. 964–5 and 1380.

ALBERT T. MEYERS, Primary Examiner
L. SCHENKMAN, Assistant Examiner

U.S. Cl. X.R.

424—153, 247, 304, 317, 346

PO-1050
(5/69)

UNITED STATES PATENT OFFICE
CERTIFICATE OF CORRECTION

Patent No. 3,777,019          Dated December 4, 1973

Inventor(s) Howard J. Levin

It is certified that error appears in the above-identified patent and that said Letters Patent are hereby corrected as shown below:

Column 2, line 70, "1.4" should read --1.0--

Signed and sealed this 9th day of April 1974.

(SEAL)
Attest:

EDWARD M. FLETCHER, JR.　　　　　　　　　C. MARSHALL DANN
Attesting Officer　　　　　　　　　　　　　Commissioner of Patents